Oct. 25, 1932. M. G. HILPERT 1,884,688
TRUCK SUPPORTED LOAD CARRYING STRUCTURE
Filed April 8, 1931 4 Sheets-Sheet 1

INVENTOR
Meier George Hilpert,
BY
ATTORNEY

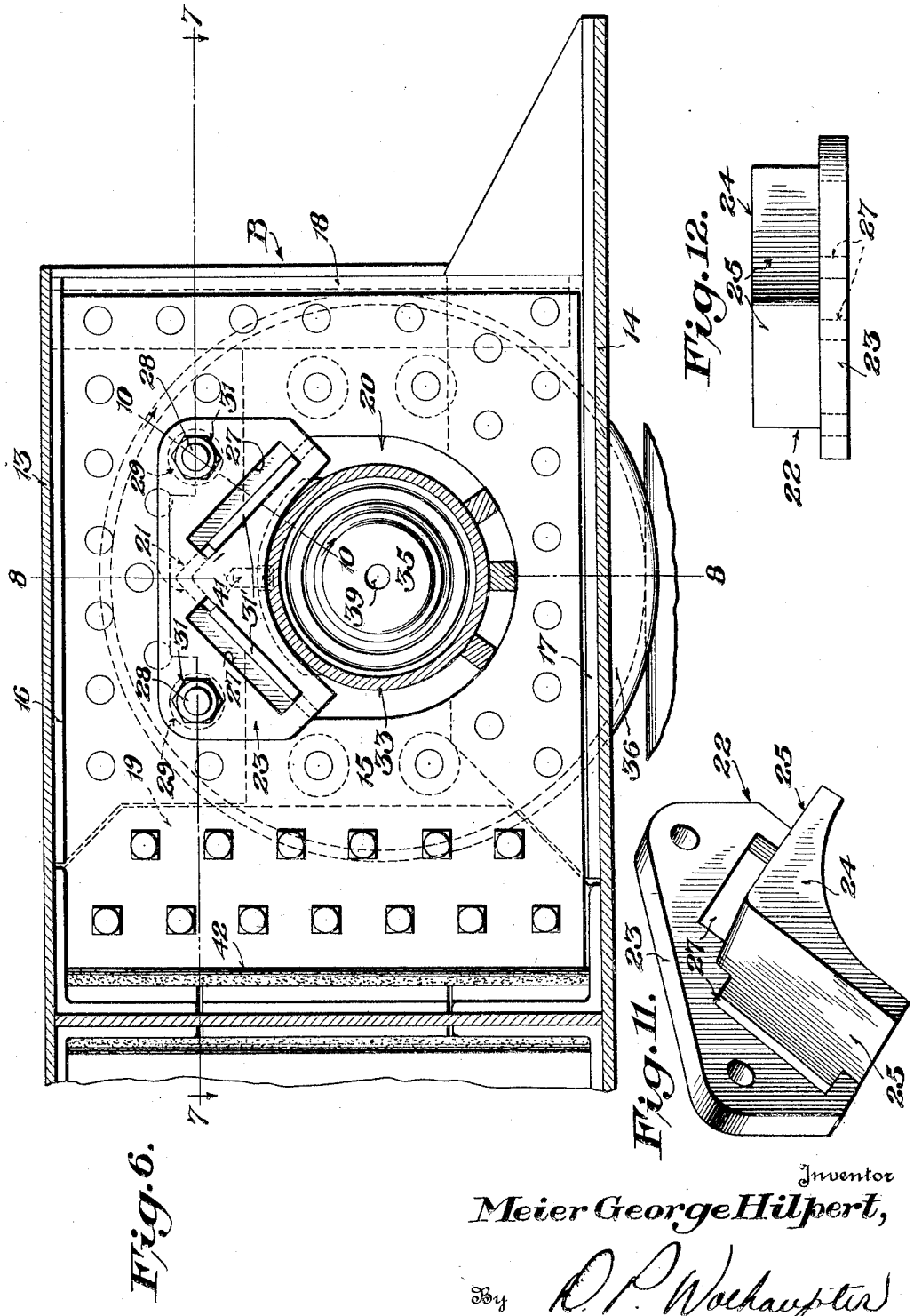

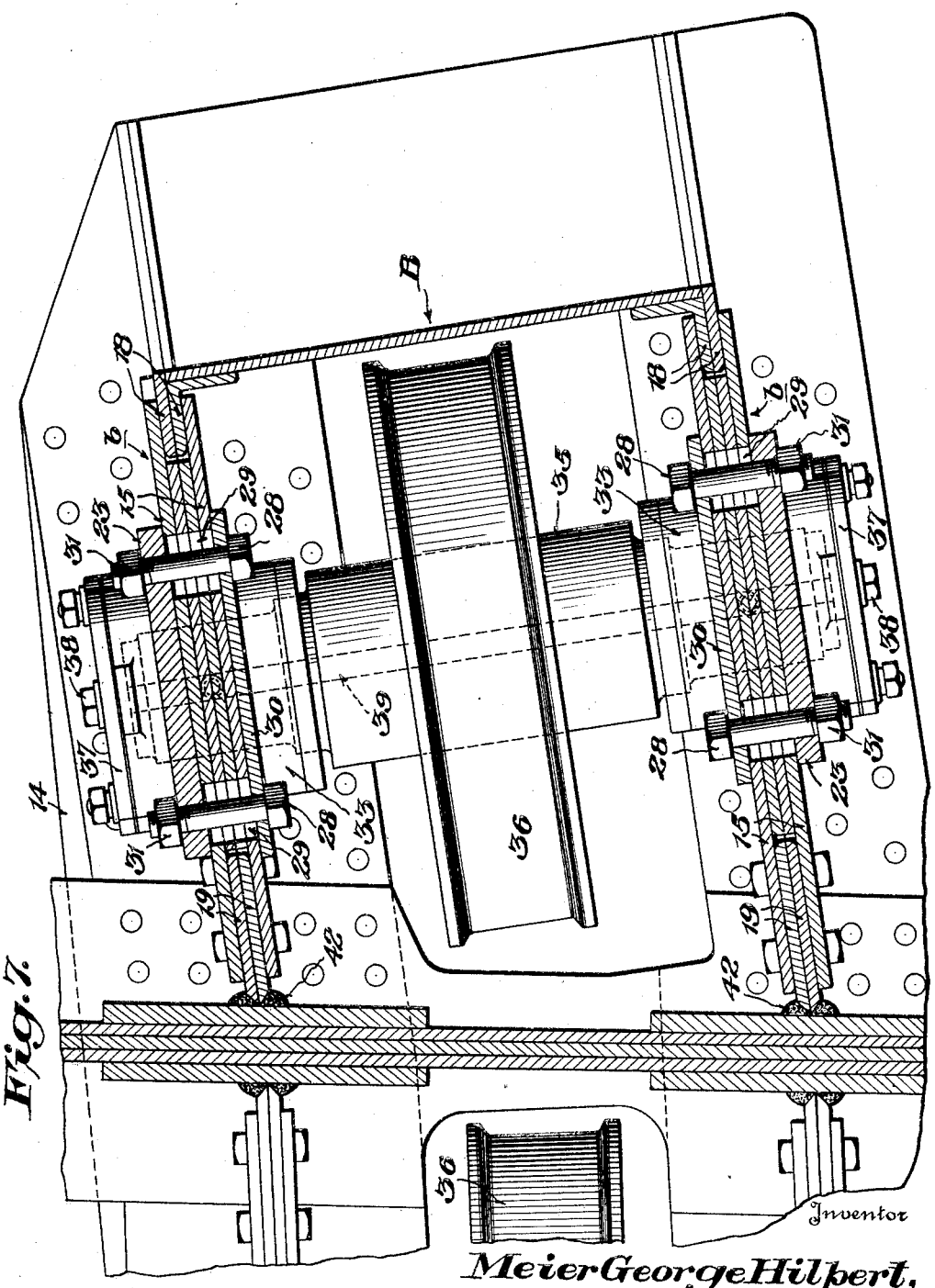

Oct. 25, 1932.  M. G. HILPERT  1,884,688
TRUCK SUPPORTED LOAD CARRYING STRUCTURE
Filed April 8, 1931   4 Sheets-Sheet 4
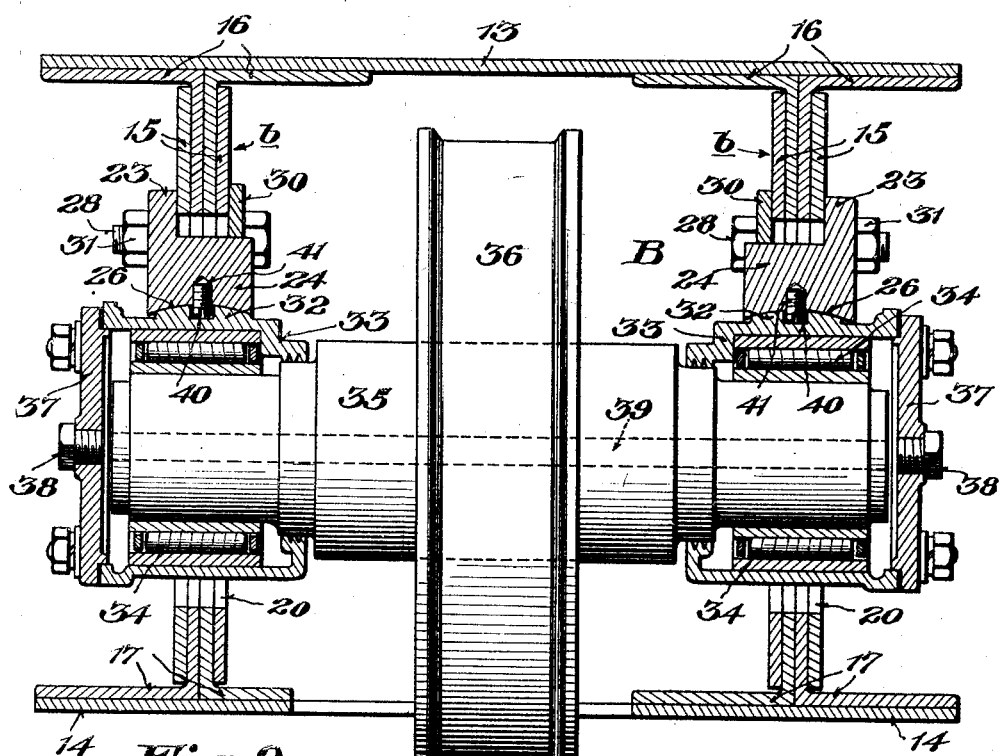
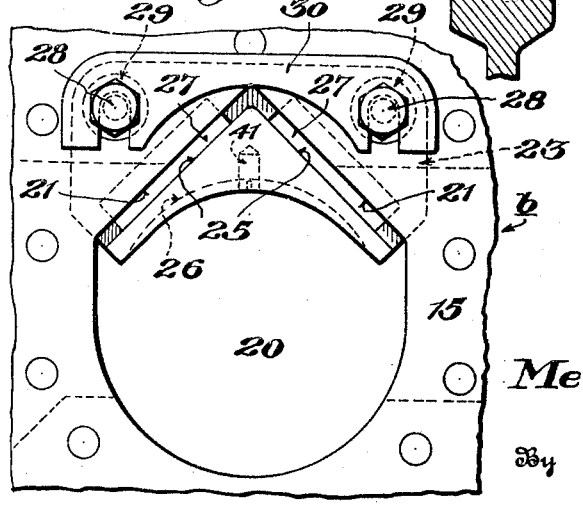
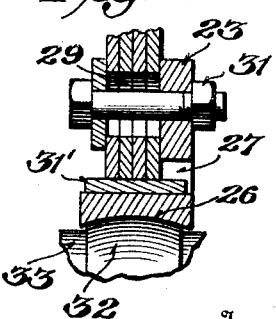
Inventor
Meier George Hilpert,
By
Attorney Patented Oct. 25, 1932

1,884,688

UNITED STATES PATENT OFFICE

MEIER G. HILPERT, OF BETHLEHEM, PENNSYLVANIA

TRUCK SUPPORTED LOAD CARRYING STRUCTURE

Application filed April 8, 1931. Serial No. 528,621.

My present invention relates to the same general subject-matter as disclosed in my Patent No. 1,831,112 dated November 10, 1931, viz., bridge cranes of different types, movable gantry or loading and unloading bridges, transfer tables, turntables, and the like, and has particular reference to the provision of certain novel and desirable features representing a carrying forward of the invention disclosed in said application.

Generally speaking, the invention disclosed in my prior application involves the provision of a load carrying structure and wheeled supporting trucks therefor adapted to be operatively and detachably connected therewith with the wheel axles aligned while the structure is subjected to a substantially normal load, whereby the structure in service possesses long life and involves relatively low maintenance costs.

According to the patent referred to the axles of the truck wheels are provided with axial bores and alignment of the axles is effected by a novel method involving either the sighting through said bores by the aid of suitable instruments or the utilization of said bores in any other suitable manner to effect the alignment, said method constituting the subject-matter of my copending application, Serial Number 537,371, filed May 14, 1931 as a division of my aforesaid Patent No. 1,831,112. Moreover, according to the disclosure of said parent application, the trucks are of such construction that after the same have been initially secured to the load carrying structure with their axles aligned, they may be detached from said structure for shipping or for other purposes and subsequently assembled with said structure in the same relation thereto as was initially established, as, for example, at the place where the crane or the like is to be used. In other words, while it is possible according to the structure and method disclosed in my parent application to effect alignment of the truck axles and to properly mount the trucks on the load carrying structure at the place where the device is to be used, the invention as disclosed in said application contemplates primarily the provision of a structural arrangement by which the aligning of the truck axles and the initial mounting of the trucks on the load carrying structure is adapted to be effected in the shop in such manner that the device may readily be disassembled for shipping and subsequently erected in the field without the necessity of repeating the initial axle aligning and truck attaching operations.

The present invention has in view to retain the various advantages of the prior structure and, in addition, has for one of its special objects to provide a structural arrangement whereby adjustment of the truck axles may readily be effected in the field to restore their alignment should the same for any reason become disaligned in use.

Another object of the invention resides in the provision of a novel structure whereby radially disposed axles such as are employed in connection with turntables and the like may readily be aligned in accordance with my heretofore mentioned method.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 6 is an enlarged end elevation, partly in section, illustrating the connection between one of the trucks and the load carrying structure.

Figure 7 is a horizontal section on the line 7—7 of Fig. 6.

Figure 8 is a vertical section on the line 8—8 of Fig. 6.

Figure 9 is an elevation looking toward the inner face of one of the pedestals with the saddle block applied thereto.

Figure 10 is a detail section on the line 10—10 of Fig. 6.

Figure 11 is a perspective view of the saddle block looking toward the rear face thereof; and Figure 12 is a top plan view of the saddle block.

By reference to the drawings it will be noted that the novel features of the invention are illustrated in the present instance as embodied in a turntable. It is to be understood, however, that this is merely for convenience in effecting a comprehensive disclosure of one specific embodiment of the invention and is not to be construed as in any way confining the same to embodiment in load carrying structures of this particular type, since the features of the invention are as readily capable of embodiment in various other structures such as bridge cranes and the like without departing in any way from the basic principles underlying the inventive concept.

Figure 1:
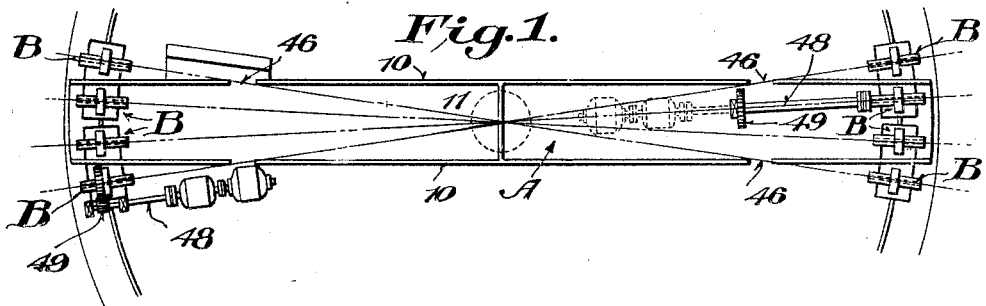
Figure 1 is a diagrammatic top plan view of a turntable showing the present structural arrangement adapting radially disposed truck axles to be aligned and to be connected with a load carrying structure in aligned relation.
Figure 2:
Figure 2 is a diagrammatic side elevation of the structure shown in Fig. 1.

The turntable conventionally illustrated in Figs. 1 and 2 is of the continuous span type and is inclusive essentially of a load carrying span or structure designated generally as A equipped at its ends with trucks designated generally as B, and preferably but not necessarily is medially supported for rotation on a suitable pedestal designated as C.

The load carrying span A is illustrated in the present instance as comprising a pair of parallel girders 10, 10 rigidly connected together by a medial cross plate or web 11 and at other points by suitable transverse bracing, not shown, or preferably by top plates and/or flexing connections between the adjacent ends of inside trucks B, all of which may be varied in accordance with the requirements of each individual span. Located at the ends of the girders are upper and lower compression and tension plates 13 and 14 respectively, between which the trucks B are mounted.

The plates 13 and 14 extend in the instant case beyond the sides of the girders 10, 10 and at each end of the span A said plates have mounted therebetween four trucks B, two between the girders 10, 10 and one at the outer side of each girder. However, this is a purely arbitrary arrangement, and since the trucks B are to all intents and purposes duplicates of one another, and are or may be connected with the span A in duplicate fashion, only one of said trucks and the manner of connecting the same with the span need be illustrated and described in detail.

Referring particularly to the truck structure illustrated in Figs. 6 to 8, it will be observed that the same comprises a pair of pedestal elements $b$, $b$ each of which is inclusive of a pair of plates 15, 15 of rectangular shape which approximate in height the distance between the plates 13 and 14 and which have riveted or otherwise rigidly secured in face to face abutting relation between the upper and lower and outer marginal portions thereof inwardly directed flanges of upper, lower and outer pairs of angle iron members 16, 16, 17, 17 and 18, 18, respectively, the other flanges of which extend laterally outward relative to said plates. In addition, said plates 15, 15 have bolted or otherwise detachably secured between their inner marginal edges a vertically disposed plate or plates 19 adapted to be welded or otherwise permanently and rigidly secured either directly or indirectly to the related girder 10 of the span A.

Formed through the plates 15, 15 centrally or approximately centrally thereof are alined openings 20 the lower portions of which preferably are of circular shape and the upper portions of which are of inverted V-shape, thereby providing downwardly and outwardly directed bearing edges 21, 21.

At 22 is designated, generally, a saddle block which is inclusive of a plate portion 23 having a lateral extension 24 of substantially inverted V-shape, the upper surfaces 25 of which are directed downwardly and outwardly corresponding to the downward and outward inclination of the bearing edges 21 of the plates 15, 15, and the under surface of which is spherically concaved as indicated at 26. Formed through the plate 23 of said saddle block is a pair of downwardly and outwardly inclined openings 27, 27 the lower edges of which are disposed flush with and form continuations of the downwardly and outwardly inclined upper faces of the lateral extension 24. Bolt holes are formed at suitable points through the plate portion 23 to snugly receive bolts 28, while formed through the plates 15, 15 are relatively large holes 29 for the accommodation of said bolts.

One of the saddle blocks 22 is adapted to be secured by means of the bolts 28 to each pedestal element $b$ with the plate 23 of the saddle block disposed against the outer face of the outer plate 15 and with the lateral extension 24 extending through the openings 20 of said plates 15, 15, the bolts 28 extending through the holes 29 in the plates 15, 15 and through slots in a keeper plate 30 and having nuts 31 threaded on their ends against said keeper plate whereby the saddle block is clamped securely in a desired position of adjustment relative to the pedestal element as permitted by the relatively large holes 29 and as determined by the truck axle aligning method and by shims 31' interposed between the cooperating downwardly and outwardly inclined bearing edges 21 of the plates 15, 15 and the upper similarly inclined faces of the saddle block extension 24.

When the saddle blocks are operatively connected with the pedestal elements b in the manner described the spherically concaved under faces 26 of the lateral extensions 24 are disposed near the tops of the openings 20 in the plates 15, 15 each for the reception of a spherical formation 32 on the top portion of a bearing housing 33, thus to provide for universal movement of the bearing housings relative to the saddle blocks.

Within each bearing housing is a bearing 34, and as is understood, of course, each truck B is inclusive of a pair of the bearings related, respectively, to the pair of pedestal elements b, b. Mounted at its ends in the bearings 34, 34 of each truck is an axle 35 on which is mounted, between the pedestal elements b, b a truck wheel 36.

Each bearing housing 33 is closed at its outer side by a removable cover plate 37 having an opening therein axially aligned with the axle 35 and normally closed by a screw plug 38, while formed through each axle is an axial bore 39 which is accessible through the opening in the cover plate when the plug 38 is removed.

Rotation of the bearing housings relative to the saddle blocks is undesirable. Consequently, in order to prevent such rotation and at the same time to permit universal pivotal movement of each bearing housing with respect to its related saddle block, a recess 40 is formed in the top of each bearing housing and a pin 41 is threaded or otherwise secured in the under portion of each saddle block to extend into the recess 40.

In a turntable or like rotatable structure it is understood, of course, that the truck axles must truly radiate from the center of the structure in order to permit the truck wheels to travel freely over a circular track rail without undue wear and tear on the structure as an entirety and particularly on the bearings of the truck axles. Accordingly, in the present case, as in my prior applications heretofore referred to, the invention contemplates subjecting the span A to a substantially normal load and then properly mounting the trucks B on the span while the same is loaded, the theory being, of course that maximum wear tends to occur when the structure is loaded and that if the truck axles are disposed to rotate freely in their bearings under such conditions the life of the structure will be prolonged and the maintenance costs thereof correspondingly reduced.

Thus, in effecting assembly of the present trucks B with the span A, the latter is temporarily supported on suitable blocks or the like and is subjected in any suitable manner, either artificially or by means of an actual load imposed thereon, to substantially the normal load that the structure is intended to carry in service. The trucks B, if they have not previously been disposed in operative relation to the span A, then are operatively positioned between the plates 13 and 14 and while the span A is maintained loaded the axles of said trucks are aligned, either by the method heretofore mentioned or in any other suitable manner, either with one another or with a fixed central point on the span A, whereupon the bolts 28 are tightened to secure the saddle blocks 22 rigidly to the pedestal elements b, b and the plates 19 are welded as at 42 or otherwise suitably secured rigidly to the girders 10.

In the initial assembly of the truck parts, shims or liners 31' preferably are interposed between the bearing edges 21 of the pedestal plates 15, 15 and the bearing surfaces 25 of the saddle elements. Thus, following assembly of the trucks with the span A in the manner mentioned, it is apparent that if for any reason the true alignment of the truck axles should be disturbed, the said alignment may readily be restored simply by replacing one or more of the original shims by another shim or shims of greater or less thickness. On the other hand, because of the detachable connection between the plates 19 and the pedestal plates 15, it is apparent that the following alignment of the truck axles and connection of the plates 19 with the girders 10, the trucks may readily be removed from the span A whereby the span and the trucks may be shipped separately for convenient reassembly in the field in the same relation as was established by the initial aligning and connecting operations.

Figures 4, 5:
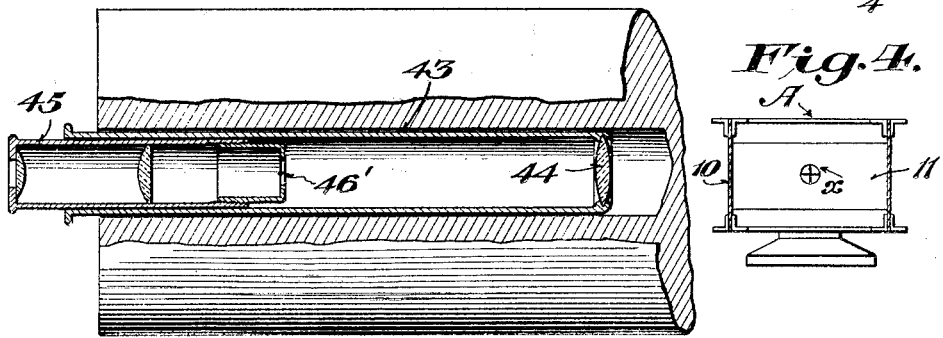
Figure 4 is a cross section on the line 4—4 of Fig. 3.
Figure 5 is an enlarged sectional view of one of the truck axles showing the aligning instruments operatively mounted therein.

In Fig. 5 of the drawings is illustrated a practical instrument for effecting alignment of the truck axles either with one another or with some fixed point on the span A, for example to a fixed point x, on web 11, Fig. 4 and whether the truck axles are disposed radially as illustrated in Fig. 1 or parallel with each other as in the case of a bridge crane or the like. The instrument referred to comprises a tube 43 having a lens 44 mounted therein at or near one end thereof and equipped at its other end with a second tube 45 slidably adjustable therein, the said second mentioned tube having lenses therein for cooperation with the lens 44 and also carrying cross hairs 46' disposed with their point of crossing or intersection centrally of the tube. The tube 43 is of a diameter to snugly fit the axial bores of the truck axles and is adapted to be engaged in the bore of first one axle and then another for use in effecting the alignment. By adjusting the tube 45 relative to the tube 43 until the respective lenses are focused, and by then adjusting the truck, the axle of which is being aligned, until the intersection of the cross hairs 46' coincides with a fixed point on the span A, as, for example, on the cross web or plate 11, or with some aligning point provided in any suitable manner centrally of a distant aligned axle, the axle or axles as the case may be may readily be adjusted to the positions desired. Either this, or any other suitable axle aligning method is employed both when initially connecting the trucks with the span A and when readjusting the trucks by means of the shims 31' to compensate for any error which may for any reason develop in the alignment of the axles.

In instances where the truck axles are disposed radially relative to a span A or its equivalent, the girders 10 and any other part which might be disposed in the line of the axles axes may be provided with openings 46 to permit aligning in the manner explained by sighting through the axles and through said openings. Moreover, in any instance where a drive shaft, such as the motor driven drive shafts 48 illustrated in Figs. 1 and 2, is or are connected in end to end relation with one or more of the truck shafts, the said drive shaft or shafts may, like the truck shafts, be formed with axial bores to permit sighting therethrough. On the other hand, the drive shaft or shafts may be offset either laterally or vertically relative to the truck axles to afford a clear line of vision through the truck axles to a sighting point, and in such instances the drive shaft or shafts may be operatively connected with the truck axle or axles in any preferred manner, as, for example, by means of gears 49 as conventionally illustrated in Figs. 1 and 2.

Figure 3:
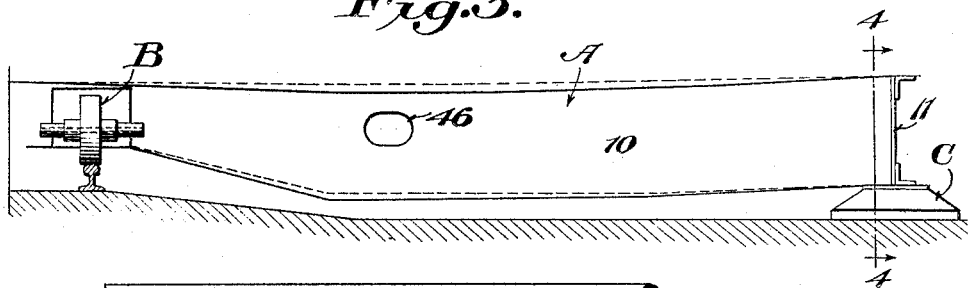
Figure 3 is a view similar to Fig. 2 illustrating the truck axle aligning method.

In Fig. 3 of the drawings is graphically illustrated a method of effecting desired adjustment or alignment of the truck axles involving sighting by means of the instrument illustrated in Fig. 5 to an index point placed on the transverse center line and at a suitable elevation on the cross web 11. In Fig. 3 the dotted lines indicate the deflection of the span due to its own weight and the full lines indicate the increased deflection of the span due to the same being subjected to a normal load and an axle at the end would align to the error of these deflections unless corrected, i. e. aligned to a fixed point on web 11 or to the center of the co-acting axle through a hole in the web 11. These deflections may be computed on the basis of the structural characteristics of the span and a point may thus be established on the cross web 11 or its equivalent with which the truck axles should align when the trucks are properly connected with the span. Thus, by aligning the axles with said point by the sighting method heretofore mentioned, or in any other suitable manner, the proper axle alignment may be readily effected.

Regarding the use of the shims 31' to effect and maintain alignment of the truck axles, it is apparent that due to the downward and outward inclination of the shim bearing edges 21 of the plates 15 and the surfaces 25 of the saddle elements 22, the shims may be employed either to lower the axles relative to the pedestal elements, to lower the pedestal elements relative to the axles, or to move the axles in either direction laterally relative to the pedestal elements. Consequently, proper positioning of the trucks requires substantially the mere selection of shims of the proper thickness to be used between the different coacting bearing surfaces 21—25.

During shipping of the trucks the bearing housings 33 with their axles may be maintained in assembly with the pedestal plates 15 by means of blocks driven between the lower edges of the openings 20 and the bottoms of the bearing housings, which blocks may be knocked out when the trucks are reassembled with the span A, since under such conditions the weight of the span will maintain the saddle elements seated against the spherical top surfaces of the bearing housings.

It is evident from the foregoing that with standard axial bores in shafts and/or axles, and with a standard diameter set of instruments to closely fit said bores that in addition to being used in the preliminary or shop alignment, as necessary and/or the occasional later alignment due to damage of the crane, or partial wrecking of same, the said standard instruments may be used at any time to check the alignment of any one or all axles or shafts. This checking is quickly done by simply removing the plugs 38, 38 and may be done with great precision by anyone with good eyesight and with or without any previous knowledge of the ordinary methods of machinery adjusting or aligning, i. e. may be done by any operator instead of by expert machinists. This method of checking requiring less time will therefore require little delay to the operation of the machine and is more likely to be done and if alignment is found perfect any excess of power consumption or wear will be run down to actual cause and not charged to a believed misalignment.

It may also be pointed out that the hollow axles permit of placing a sufficient light therein so that the beam of light may be projected through the hollow axles on to the fixed point $x$. That is to say the light beam of a search light or flash light may be focused on the fixed point $x$ by placing the flash light in the hollow bore, if desired.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A structure of the character described comprising a load carrying span, supporting trucks adjustably connected with said span, said trucks having axially bored axles through which a sight is to be taken to effect desired positioning of the axles relative to the span, and the span having sighting openings formed through such portions thereof as are disposed between the truck axles and a point to which the sight is to be taken.

2. A structure of the character described comprising a load carrying span inclusive of laterally spaced girders, trucks adjustably connected with said girders at the outer sides thereof, said trucks being inclusive of axles having axial bores through which sight is to be taken to align the axles with a point disposed centrally of the span between the girders, and the webs of said girders having sighting openings formed therethrough to permit sighting through the axles and said girders to said central point.

3. A structure of the character described comprising a load carrying span, and supporting trucks mounted on said span, said supporting trucks each being inclusive of spaced pedestal elements rigid with the span, bearings mounted in said pedestal elements for vertical and lateral adjustment, means for so adjusting said bearings, and a wheel carrying axle journaled at its ends in said bearings.

4. In a structure of the character described, a load carrying span, a pair of spaced truck pedestal elements rigid with said span, a saddle block adjustably mounted on each pedestal element, cooperating diverging surfaces on said pedestal elements and said saddle blocks respectively adapted to have shims interposed therebetween to effect desired adjustments of the saddle blocks relative to the pedestal elements, bearings supported by the saddle blocks, and a wheel carrying axle extending between said bearings and journaled at its ends in the latter.

5. In a structure of the character described, a load carrying span, a pair of spaced truck pedestal elements rigid with said span, a saddle block adjustably mounted on each pedestal element, cooperating diverging surfaces on said pedestal elements and said saddle blocks respectively adapted to have shims interposed therebetween to effect desired adjustments of the saddle blocks relative to the pedestal elements, bearings supported by the saddle blocks, for universal movement relative thereto, and a wheel carrying axle extending between said bearings and journaled at its ends in the latter.

6. In a structure of the character described, a load carrying span, a pair of spaced truck pedestal elements rigid with said span and having openings therein, a pair of saddle blocks each inclusive of a plate adjustably secured against its related pedestal element and also inclusive of a lateral extension projecting into the opening of the related pedestal element, the pedestal elements each having downwardly and outwardly diverging bearing surfaces and the saddle blocks each having cooperating downwardly and outwardly diverging bearing surfaces, shims interposed between said surfaces, bearing housings seated against the under sides of the lateral extensions of said saddle blocks, and a wheel carrying axle journaled at its ends in said bearing housings.

7. In a structure of the character described, a load carrying span, a pair of spaced truck pedestal elements rigid with said span and having openings therein, a pair of saddle blocks each inclusive of a plate adjustably secured against its related pedestal element and also inclusive of a lateral extension projecting into the opening of the related pedestal element, the edges of the pedestal elements defining the tops of the openings therein being diverged downwardly and outwardly, the top surfaces of the lateral extensions of the saddle blocks being diverged downwardly and outwardly, shims interposed between the said diverging edges of the pedestal elements and the top surfaces of the saddle blocks, bearing housings seated against the under sides of the saddle blocks, and a wheel carrying axle journaled at its ends in said bearing housings.

8. In a structure of the character described, a load carrying span, a pair of spaced truck pedestal elements rigid with said span and having openings therein, a pair of saddle blocks each inclusive of a plate adjustably secured against its related pedestal element and also inclusive of a lateral extension projecting into the opening of the related pedestal element, the edges of the pedestal elements defining the tops of the openings therein being diverged downwardly and outwardly, the top surfaces of the lateral extensions of the saddle blocks being diverged downwardly and outwardly, shims interposed between the said diverging edges of the pedestal elements and the top surfaces of the saddle blocks, each saddle block having a spherically concaved under face, each bearing housing having a spherically convex top surface seating against the under surface of its related saddle block, and a wheel carrying axle journaled at its ends in said bearing housings.

9. In a structure of the character described, a load carrying span, a pair of spaced truck pedestal elements rigid with said span and having openings therein, a pair of saddle blocks each inclusive of a plate adjustably secured against its related pedestal element and also inclusive of a lateral extension projecting into the opening of the related pedestal element, the edges of the pedestal elements defining the tops of the openings therein being diverged downwardly and outwardly, the top surfaces of the lateral extensions of the saddle blocks being diverged downwardly and outwardly, shims interposed between the said diverging edges of the pedestal elements and the top surfaces of the saddle blocks, each saddle block having a spherically concaved under face, each bearing housing having a spherically convex top surface seating against the under surface of its related saddle block, a wheel carrying axle journaled at its ends in said bearing housings, and means restricting the permissible movement of each bearing housing relative to its related saddle block to a universal pivotal movement.

10. In a structure of the character described, a load carrying span, a pair of spaced truck pedestal elements rigid with said span, a saddle block adjustably mounted on each pedestal element, cooperating diverging surfaces on said pedestal elements and said saddle blocks respectively adapted to have shims interposed therebetween to effect desired adjustments of the saddle blocks relative to the pedestal elements, bearings supported by the saddle blocks, a wheel carrying axle extending between said bearings and journaled at its ends in the latter, and means restricting the universal movement of each bearing relative to its related saddle block to a universal pivotal movement.

11. A structure of the class described comprising a load carrying span, supporting trucks therefor, said trucks having axially bored axles through which a sight is to be taken to effect desired positioning of the axles relative to the span, and said span having sighting openings formed through such portions thereof as are disposed between the truck axles.

12. A structure of the character described comprising a load carrying span, supporting trucks for said span, said trucks having axially bored axles whereby a light beam may be projected therethrough to effect desired positioning of the axles relative to the span, and the span having openings formed through such portions thereof as are disposed between the truck axles and a point on which the beam is projected.

13. A structure of the class described comprising a load carrying span and supporting trucks mounted on said span, said supporting trucks each being inclusive of spaced pedestal elements rigid with the span, said pedestal elements having inverted V-shaped openings therein, bearings mounted in said openings, and a wheel carrying axle journaled in said bearings.

14. A structure of the character described comprising a load carrying span, supporting trucks placed radially and adjustably connected with said span, said trucks having an axially bored axle through which a sight is to be taken to effect desired positioning of the axles relative to the span, and the span having sighting openings formed through such portions thereof as are disposed between the truck axles.

In testimony whereof I hereunto affix my signature.

MEIER G. HILPERT.